Patented Aug. 14, 1951

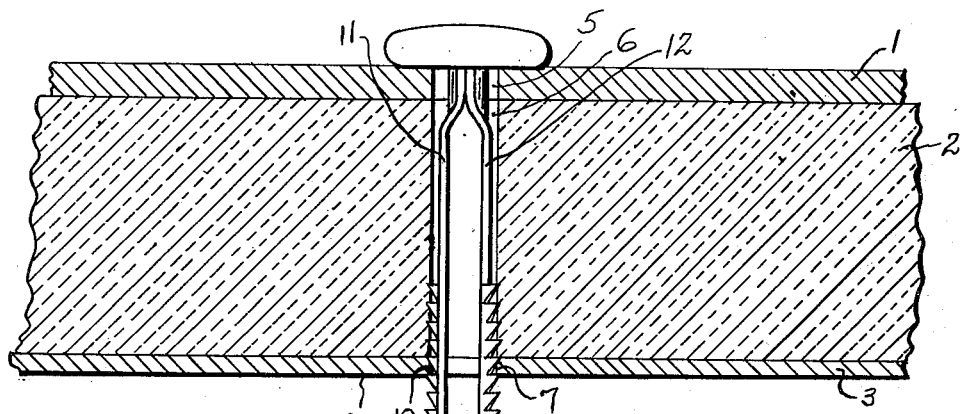
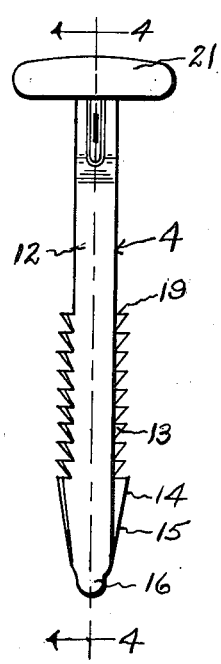
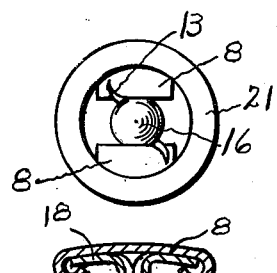
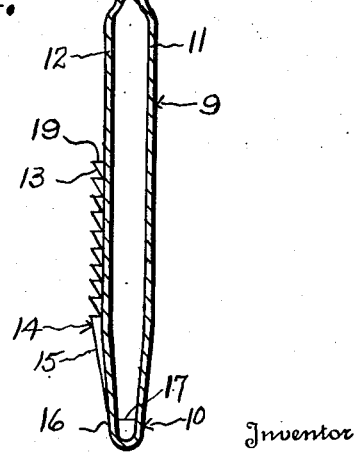

2,564,638

UNITED STATES PATENT OFFICE 2,564,638

FASTENER DEVICE

Wilmer H. Churchill, Saugus, Mass., assignor to United-Carr Fastener Corporation, Cambridge, Mass., a corporation of Massachusetts Application July 23, 1946, Serial No. 685,612

1 Claim. (Cl. 85—5)

This invention relates to improvements in fastener members of the type shown generally in my United States Patent No. 2,229,996, issued January 28, 1941. This type of fastener has been used commercially in large quantities for securing a part, such as a floor or dash mat of an automobile, to the automobile body. When the fastener has been used in installations of this type the outermost ends of the fasteners usually project for an appreciable distance into the engine or hooded section of the automobile. Numerous complaints have been received from mechanics working under the hood that they have scratched their hands or arms on the relatively sharp pointed leading ends of the fasteners of the specific construction shown in the above-mentioned patent. For this reason the chief object of my present invention is to provide a blunt or rounded element at the leading end of the fastener which will not injure or otherwise inconvenience an individual who comes into direct contact with it.

Other objects and uses of my invention will be apparent from an inspection of the drawing and specification hereinbelow set forth.

Referring to the drawing in which I have illustrated a preferred embodiment of my invention:

Fig. 1 is a section through an installation of my improved fastener, the fastener being shown in elevation;

Fig. 2 is a side elevation of my improved fastener;

Fig. 3 is a bottom view of the fastener illustrated in Fig. 2; and

Fig. 4 is a section taken along the line 4—4 of Fig. 2.

Referring to Fig. 1 in which I have shown a preferred use of my improved fastener, I have shown a unit, such as a floor mat, which may comprise an outer panel 1 and an insulating panel 2 which is secured to the support 3, which may be the dash liner of the automobile, by means of the fastener member 4. The mat unit is disposed in superposed relation to the support 3 and the parts 1 and 2 have respective aligned openings 5 and 6 which line up generally with an opening 7 of the support.

The fastener of my present invention is formed from a single piece of metal and provides a head 8 and a shank 9 which extends from the head 8 to its leading end 10. The shank 9 has a pair of opposed yieldable narrow legs 11 and 12. A series of teeth 13 project laterally from each of the legs for ratchet engagement with the under surface of the support 3 in a manner which will be described. The teeth 14 adjacent the leading end 10 of the shank may have a relatively long leading edge 15 for guiding the lead end through the parts to be secured, as will be understood by those skilled in the art.

At the outermost end or nose of the shank I have provided a cup-shaped element 16 which is substantially semi-spherical in form and provides a circumferential free edge 17 (Fig. 4) facing the head. The legs 11 and 12 are integrally joined to the edge 17 at diametrically opposite points thereon and project toward the head 8 with their inner broad surfaces in facing relation. The legs 11 and 12 in my preferred form diverge slightly from the edge 17, then extend in substantially parallel relation and then converge into substantially contiguous relation to their points of junction with the head 8. Each of the legs 11 and 12 has a laterally extending portion 18 at its end away from the leading end 10. The portions 18 extend in opposite directions and cooperate to form the head 8 of the fastener.

In assembling the parts of the installation the shank 9 of the fastener is moved through the aligned openings 5, 6 and 7 of the parts to be secured. During this action the legs 11 and 12 are compressed until the fastener has been extended a desired distance along its length at which time the legs expand to engage the shoulders 19 of the teeth 13 behind the lower surface 20 of the support 3. Thus the floor mat is held in place between the head 8 of the fastener and the shoulders 19 of the appropriate teeth elements. When the installation is complete a substantial portion of the length of the shank 9 will, in most instances, extend beyond the lower surface 20 of the support 3, as illustrated in Fig. 1. The rounded outermost surface of the semi-spherical portion 16, however, provides a blunt end to the fastener in its exposed position which will not injure or inconvenience anyone working in the vicinity of the exposed end who may come into contact with it. If desired, a cap 21 may be applied to the head 8 so as to give a finished appearance to the fastener on the inner side of the automobile.

While I have illustrated and described a preferred embodiment of my invention, I do not wish to be limited thereby, because the scope of my invention is best defined by the following claim.

I claim:

A fastener stud comprising a one-piece strip of relatively wide, thin sheet material having outwardly flanged terminal ends forming a head, opposed spaced legs forming a shank and a semispherical cup-shaped member formed from an intermediate portion of said strip joining said legs and forming a leading end; the legs of said shank having substantially flat side faces being disposed in substantially parallel spaced relation for a major portion of their length providing a shank portion of generally rectangular cross section, at least one side edge of each leg being provided with a series of teeth extending outwardly and obliquely beyond the plane of said legs for engagement with a marginal edge of an aperture in a supporting part at diametrically opposite points therein, the upper ends of said spaced legs being convergent and in abutting engagement with each other adjacent the head end thereof to provide a non-contractible head, said shank being laterally yieldable throughout a limited region between said head and leading ends; the cup-shaped semispherical member of said leading end having its outer arcuate surface in continuation with the flat outer faces of said legs and having a free edge at the top thereof facing said head and connecting the adjacent ends of said legs in rigid relation, and said cup-shaped semispherical member being of materially less cross sectional area than that of the generally rectangular shank portion; and each of said legs being further formed with an inclined leading edge joining the free edge of said cup-shaped semispherical member and the adjacent lowermost tooth of said leg.

WILMER H. CHURCHILL.

REFERENCES CITED

The following references are of record in the file of this patent:

UNITED STATES PATENTS

| Number | Name | Date |
|---|---|---|
| 1,056,452 | Remhilt | Mar. 18, 1913 |
| 1,127,090 | Reedy | Feb. 2, 1915 |
| 2,137,210 | Lombard | Nov. 15, 1938 |
| 2,138,195 | Place #2 | Nov. 29, 1938 |
| 2,142,429 | Wiley | Jan. 3, 1939 |
| 2,191,412 | Pihl | Feb. 20, 1940 |
| 2,229,996 | Churchill #1 | Jan. 28, 1941 |
| 2,267,873 | Place | Dec. 30, 1941 |
| 2,295,449 | Churchill #2 | Sept. 8, 1942 |
| 2,391,298 | Davis | Dec. 18, 1945 |